US012638310B2

(12) United States Patent
Kato et al.

(10) Patent No.: US 12,638,310 B2
(45) Date of Patent: May 26, 2026

(54) PROXIMITY SENSOR AND CONTROLLER

(71) Applicant: Murata Manufacturing Co., Ltd., Nagaokakyo (JP)

(72) Inventors: Takatoshi Kato, Nagaokakyo (JP); Hiroshi Watanabe, Nagaokakyo (JP); Kohei Sugahara, Nagaokakyo (JP); Koichi Inoue, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 298 days.

(21) Appl. No.: 18/382,611

(22) Filed: Oct. 23, 2023

(65) Prior Publication Data

US 2024/0044671 A1    Feb. 8, 2024

Related U.S. Application Data

(63) Continuation of application No. PCT/JP2022/018534, filed on Apr. 22, 2022.

(30) Foreign Application Priority Data

May 18, 2021    (JP) ................................. 2021-084098

(51) Int. Cl.
*G01D 5/241*            (2006.01)
(52) U.S. Cl.
CPC .................................... *G01D 5/241* (2013.01)
(58) Field of Classification Search
CPC .......... G01D 5/241; G06F 2203/04108; G06F 3/0416; G06F 3/044; H01H 36/00;
(Continued)

(56) References Cited

U.S. PATENT DOCUMENTS

2007/0269012 A1* 11/2007 Somers ................. A61B 6/102
378/117
2011/0025345 A1* 2/2011 Unterreitmayer .... H03K 17/962
324/600
(Continued)

FOREIGN PATENT DOCUMENTS

JP            2006112959 A        4/2006
JP            2008511954 A        4/2008
(Continued)

OTHER PUBLICATIONS

International Search Report in PCT/JP2022/018534, mailed Jul. 26, 2022, 3 pages.
(Continued)

*Primary Examiner* — Judy Nguyen
*Assistant Examiner* — Brent J Andrews
(74) *Attorney, Agent, or Firm* — Keating & Bennett, LLP

(57)            ABSTRACT

A proximity sensor includes one or more detection electrodes to be capacitively coupled to an object, a contact electrode contactable with the object, an excitation circuit connected to one of the one or more detection electrodes or the contact electrode to supply an excitation voltage to the electrode to which the excitation circuit is connected, and a detection circuit connected to the other of the one or more detection electrodes or the contact electrode to generate, based on a detection voltage at the electrode connected to the detection circuit, a detection signal in response to an electrostatic capacitance between the one of the one or more detection electrodes and the object. The detection circuit generates the detection signal in response to the electrostatic capacitance. The detection signal indicates a proximity of the object in contact with the contact electrode to the one of the one or more detection electrodes.

16 Claims, 11 Drawing Sheets

(58) Field of Classification Search
CPC ............... H03K 17/955; H03K 17/962; H03K
2217/96073; H03K 2217/96077; H03K
3/00; H03K 4/00; H03K 5/00; H03K
6/00; H03K 7/00; H03K 9/00; H03K
11/00; H03K 12/00; H03K 17/00; H03K
19/00; H03K 21/00; H03K 23/00; H03K
25/00; H03K 27/00; H03K 29/00; H03K
99/00; H03K 2217/00
See application file for complete search history.

(56) References Cited

U.S. PATENT DOCUMENTS

| | | | |
|---|---|---|---|
| 2012/0026121 A1 | 2/2012 | Unterreitmayer et al. | |
| 2013/0057303 A1 | 3/2013 | Kaltner et al. | |
| 2016/0139285 A1 | 5/2016 | Tsuji et al. | |
| 2018/0067600 A1* | 3/2018 | Li | G01L 25/00 |

FOREIGN PATENT DOCUMENTS

| | | | |
|---|---|---|---|
| JP | 2012523191 A | 9/2012 | |
| JP | 2016006775 A | 1/2016 | |
| JP | 2016100099 A | 5/2016 | |
| JP | 2019050939 A | 4/2019 | |
| JP | 2022125479 A | 8/2022 | |
| WO | WO-2021205977 A1 * | 10/2021 | H01H 36/00 |

OTHER PUBLICATIONS

Written Opinion in PCT/JP2022/018534, mailed Jul. 26, 2022, 3 pages.

\* cited by examiner

FIG. 7A

| | vd/ve | Cab(pF) | | | | | |
| | | 10 | 3 | 1 | 0.3 | 0.1 | 0.03 |
|---|---|---|---|---|---|---|---|
| Cag/Cab | 300 | 0.003328 | 0.003342 | 0.003381 | 0.003518 | 0.003908 | 0.005273 |
| | 100 | 0.009918 | 0.009959 | 0.010075 | 0.010479 | 0.011634 | 0.015654 |
| | 30 | 0.032313 | 0.032442 | 0.032811 | 0.034097 | 0.037755 | 0.050341 |
| | 10 | 0.091055 | 0.091397 | 0.09237 | 0.095761 | 0.105312 | 0.137208 |
| | 3 | 0.250332 | 0.251105 | 0.253306 | 0.260907 | 0.281796 | 0.346445 |
| | 1 | 0.500442 | 0.501471 | 0.504388 | 0.514334 | 0.54067 | 0.613941 |

FIG. 7B

| | vd/ve | Cab(pF) | | | | | |
| | | 10 | 3 | 1 | 0.3 | 0.1 | 0.03 |
|---|---|---|---|---|---|---|---|
| Cag/Cab | 300 | 0.003352 | 0.00342 | 0.003615 | 0.004299 | 0.006245 | 0.013 |
| | 100 | 0.009988 | 0.01019 | 0.010768 | 0.012786 | 0.018505 | 0.038012 |
| | 30 | 0.032534 | 0.033179 | 0.035014 | 0.041385 | 0.059131 | 0.116384 |
| | 10 | 0.09164 | 0.093342 | 0.098168 | 0.114663 | 0.158633 | 0.283226 |
| | 3 | 0.251656 | 0.255493 | 0.266242 | 0.301536 | 0.385928 | 0.568432 |
| | 1 | 0.502204 | 0.507271 | 0.521197 | 0.564297 | 0.65343 | 0.798037 |

FIG. 7C

| SIGNAL CHANGE RATE (%) | | Cab(pF) | | | | | |
| | | 10 | 3 | 1 | 0.3 | 0.1 | 0.03 |
|---|---|---|---|---|---|---|---|
| Cag(pF) | 10 | 0.704714 | 2.339237 | 6.934944 | 22.19932 | 59.80135 | 146.5418 |
| | 3 | 0.700022 | 2.323345 | 6.88516 | 22.0101 | 59.06359 | 142.8283 |
| | 1 | 0.684079 | 2.269386 | 6.716405 | 21.37248 | 56.61884 | 131.1922 |
| | 0.3 | 0.642287 | 2.128167 | 6.276847 | 19.73872 | 50.6311 | 106.4208 |
| | 0.1 | 0.529142 | 1.747554 | 5.107034 | 15.57236 | 36.95313 | 64.07571 |
| | 0.03 | 0.351984 | 1.156565 | 3.33252 | 9.714075 | 20.85561 | 29.98586 |

FIG. 8

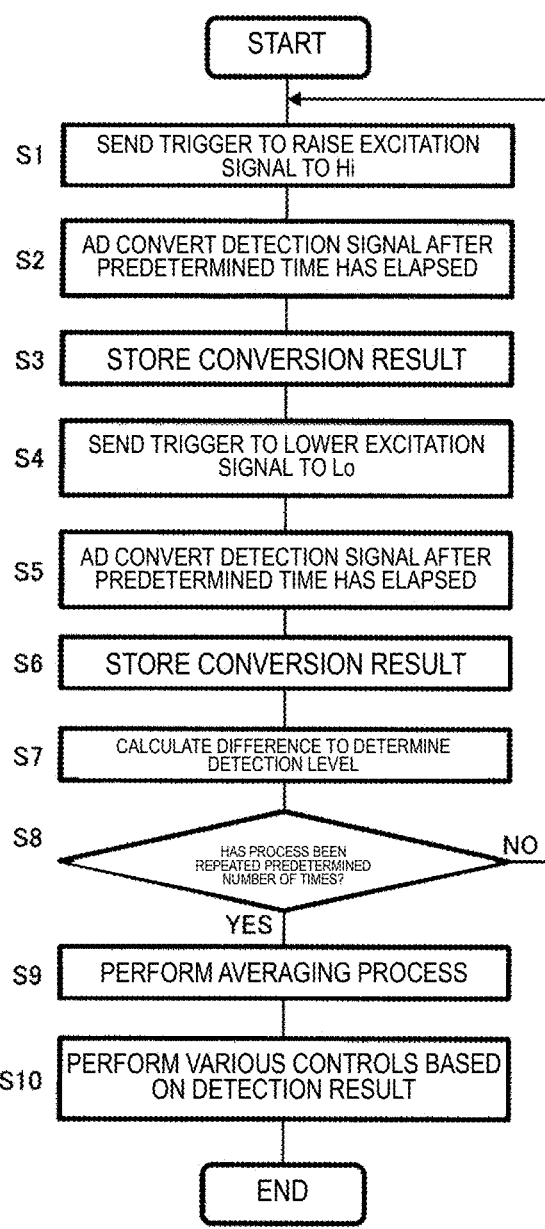

START

S1   SEND TRIGGER TO RAISE EXCITATION SIGNAL TO Hi

S2   AD CONVERT DETECTION SIGNAL AFTER PREDETERMINED TIME HAS ELAPSED

S3   STORE CONVERSION RESULT

S4   SEND TRIGGER TO LOWER EXCITATION SIGNAL TO Lo

S5   AD CONVERT DETECTION SIGNAL AFTER PREDETERMINED TIME HAS ELAPSED

S6   STORE CONVERSION RESULT

S7   CALCULATE DIFFERENCE TO DETERMINE DETECTION LEVEL

S8   HAS PROCESS BEEN REPEATED PREDETERMINED NUMBER OF TIMES?     NO

YES

S9   PERFORM AVERAGING PROCESS

S10  PERFORM VARIOUS CONTROLS BASED ON DETECTION RESULT

END

FIG. 9A
FIG. 9B
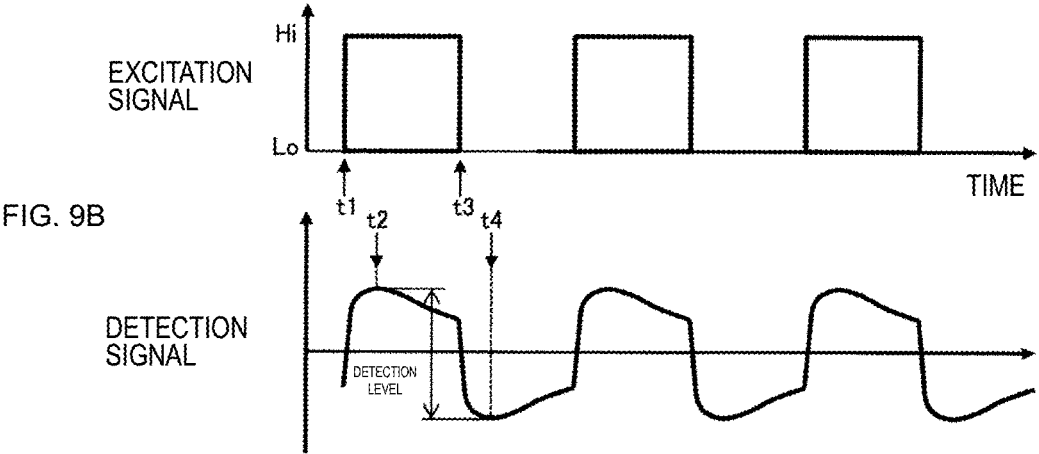
FIG. 10
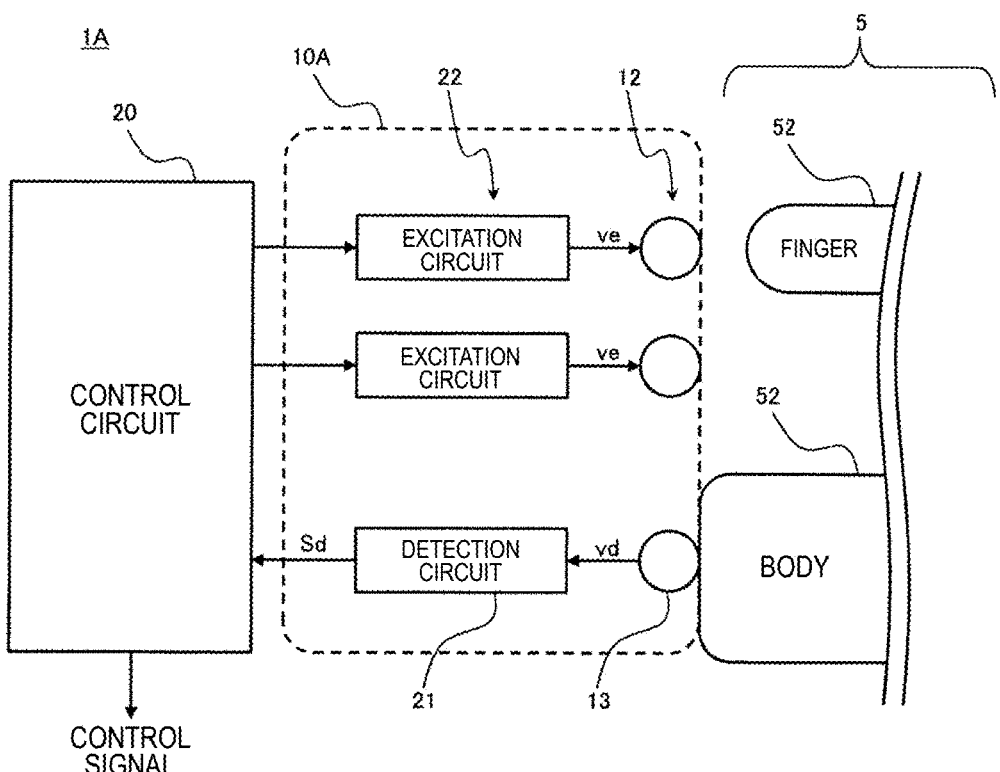

1D

10

12

18

14

13

PROXIMITY SENSOR AND CONTROLLER

CROSS REFERENCE TO RELATED APPLICATIONS

This application claims the benefit of priority to Japanese Patent Application No. 2021-084098 filed on May 18, 2021 and is a Continuation Application of PCT Application No. PCT/JP2022/018534 filed on Apr. 22, 2022. The entire contents of each application are hereby incorporated herein by reference.

BACKGROUND OF THE INVENTION

1. Field of the Invention

The present invention relates to a proximity sensor and a controller including such a proximity sensor, the proximity sensor being configured to detect a proximity of an object including, for example, a human finger.

2. Description of the Related Art

Japanese Unexamined Patent Application Publication No. 2016-6775 discloses a device for detecting a hand-held device being clasped by hand. The device includes a transmitting electrode from which an alternating electric field is emitted and a receiving electrode to which the alternating electric field is coupled at least partially. The clasping of the hand-held device by hand leads to a capacitive coupling between the transmitting electrode and the receiving electrode and is detected. In Japanese Unexamined Patent Application Publication No. 2016-6775, an electrically conductive structure to be coupled to the ground potential of the hand-held device is disposed inside the housing of the hand-held device. The electrically conductive structure is provided to reduce the capacitive coupling between the transmitting electrode and the receiving electrode and to mostly prevent spreading of the lines of electric flux from the transmitting electrode all the way to the receiving electrode. Japanese Unexamined Patent Application Publication No. 2016-6775 discloses that almost no current flows into the receiving electrode in this way when the hand-held device is not clasped by hand.

SUMMARY OF THE INVENTION

A device according to Japanese Unexamined Patent Application Publication No. 2016-6775 functions as a contact sensor configured to detect a hand-held device being clasped by hand. However, the technology known in the art such as disclosed in Japanese Unexamined Patent Application Publication No. 2016-6775 has difficulty in satisfying the need for a proximity sensor having a function of detecting not only the contact with a finger but also the proximity to a finger.

Preferred embodiments of the present invention provide proximity sensors and controllers each capable of accurately detecting a proximity of an object to a controller while an object is in contact with the controller.

A proximity sensor according to a preferred embodiment of the present invention includes one or more detection electrodes to be capacitively coupled to an object located in proximity to the one or more detection electrodes, a contact electrode to be in contact with the object, an excitation circuit that is connected to either one of the one or more detection electrodes or the contact electrode to supply an excitation voltage to the electrode to which the excitation circuit is connected, and a detection circuit that is connected to either one of the one or more detection electrodes or the contact electrode, whichever the excitation circuit is not connected to, the detection circuit being operable to, based on a detection voltage at the electrode connected to the detection circuit, generate a detection signal in response to a first electrostatic capacitance between the one of the one or more detection electrodes and the object. The detection circuit is operable to generate the detection signal in response to the first electrostatic capacitance, which is smaller than a second electrostatic capacitance between the contact electrode and the object, the detection signal indicating a degree of proximity of the object to the one of the one or more detection electrodes, the object being in contact with the contact electrode.

A controller according to a preferred embodiment of the present invention includes the proximity sensor and the control circuit to generate a control signal in response to the detection signal generated by the proximity sensor.

Proximity sensors and controllers according to preferred embodiments of the present invention are each capable of accurately detecting the proximity of an object to the controller while the object is in contact with the controller.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 7A to 7C are tables for describing relationships between parasitic capacitances of the proximity sensor.

FIG. 8 is a flowchart depicting an example of operation of the proximity sensor in the controller.

FIGS. 9A and 9B are timing charts for describing an example of operation of the proximity sensor in the controller.

FIG. 10 is a block diagram of an example of a configuration of a controller according to a second preferred embodiment of the present invention.

DETAILED DESCRIPTION OF THE PREFERRED EMBODIMENTS

Hereinafter, preferred embodiments of proximity sensors and controllers according to the present invention will be described with reference to the attached drawings.

Obviously, the preferred embodiments are described for illustrative purposes, and partial substitutions or combinations of configurations depicted in different preferred embodiments are feasible. In a second preferred embodiment and later, features common to a first preferred embodiment will not be described, and only different features will be described. In particular, similar operations and similar advantageous effects achievable by similar configurations will not individually be described in each of the preferred embodiments.

First Preferred Embodiment

1. Configuration

Figure 1:
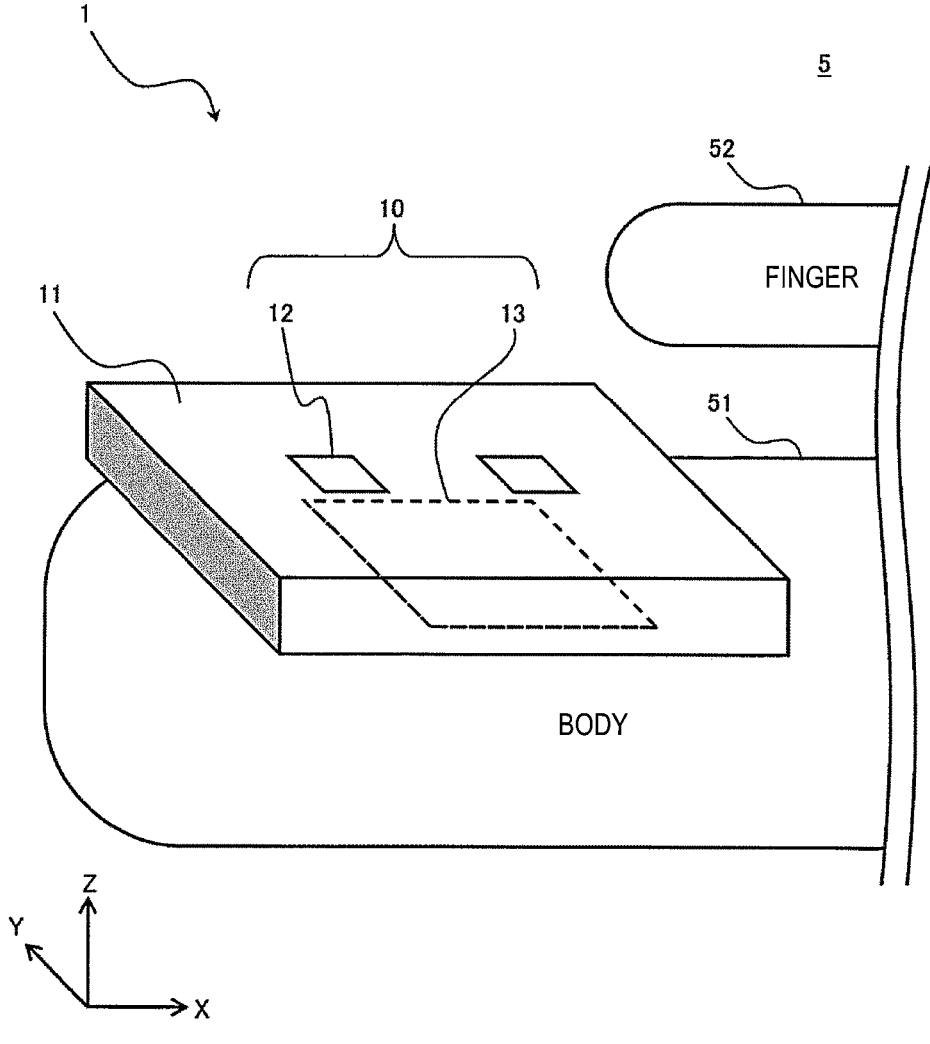
FIG. 1 schematically illustrates a controller and a proximity sensor according to a first preferred embodiment of the present invention.

A configuration of a controller and a proximity sensor according to a first preferred embodiment will be described with reference to FIG. 1. FIG. 1 schematically illustrates a controller 1 and a proximity sensor 10 according to the present preferred embodiment.

Examples of the controller 1 according to the present preferred embodiment include various types of portable devices to be attached to a body 51 of a user 5 or to be held by hand by the user 5 when in use. The controller 1 is configured to cause the proximity sensor 10 to detect operation by the user 5 such as moving a finger 52 close to the controller 1 and touching the controller 1 with the finger 52, and the controller 1 is configured to generate various control signals based on a detection result. The controller 1 includes an operation surface 11, which is a main surface, for example, to which the user 5 moves the finger 52 close for operation.

In the following description, two dimensional directions on the operation surface 11 of the controller 1 are assumed to be the X, Y directions, and a direction normal to the operation surface 11 is assumed to be the Z direction. The positive Z side, which is located above the operation surface 11 and outside the controller 1, may be referred to as the upper side, and the opposite side, which is the negative Z side, may be referred to as the lower side. In the example in FIG. 1, while the finger 52 of the user 5 is approaching from the upper side of the controller 1, the body 51 of the user 5 is in contact with a main surface on the lower side of the controller 1.

The proximity sensor 10 according to the present preferred embodiment is built into the controller 1 so as to detect the proximity of and the contact with an object, such as the finger 52 of the user 5. The proximity sensor 10 is configured to detect the degree of proximity (including contact) of an object based on electrostatic capacitance. In the present preferred embodiment, the proximity sensor 10 is configured to detect not only the contact with but also the proximity to the finger 52 of the user 5 under the condition that the controller 1 be in contact with the body 51 of the user 5 while being used.

In the present preferred embodiment, the contact with the controller 1 may be direct or indirect. For example, the user 5 may use the controller 1 wearing a glove. Even in such a case, the proximity sensor 10 may detect the finger 52 of the user 5, for example, being in contact with the controller 1 in response to a change in electrostatic capacitance.

A proximity sensor known in the art needs proper grounding and requires a closed circuit to be established to perform accurate proximity detection. Such requirements are easy to satisfy in applications, for example, for vehicles or robots but difficult to satisfy in applications for portable devices, for example, carried by the user 5. Unfortunately, a proximity sensor known in the art also detects a person other than the user 5 being in proximity.

In contrast, the proximity sensor 10 according to the present preferred embodiment also addresses the above issues for the technology known in the art. In the following description, a configuration of the controller 1 and the proximity sensor 10 according to the present preferred embodiment will be described in detail.

1-1 Details of Configuration

Figure 2:
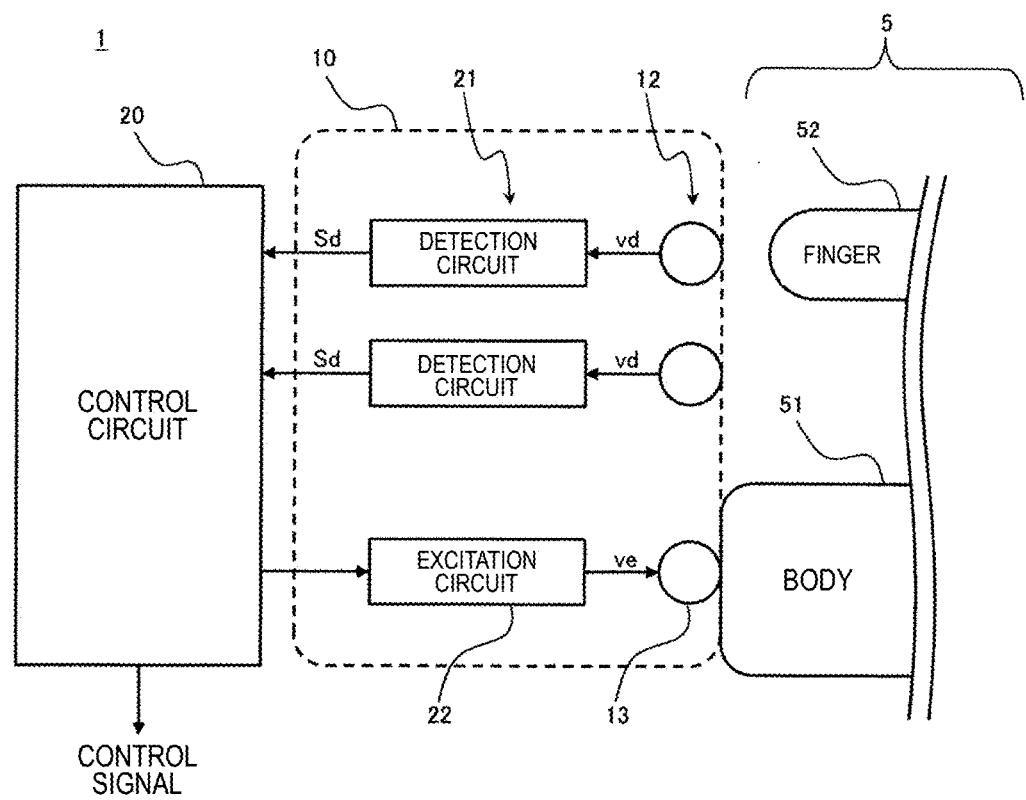
FIG. 2 is a block diagram of an example of a configuration of the controller according to the first preferred embodiment of the present invention.

FIG. 2 is a block diagram of an example of a configuration of the controller 1 according to the present preferred embodiment. The controller 1 according to the present preferred embodiment includes the proximity sensor 10 and a control circuit 20 as depicted, for example, in FIG. 2. The proximity sensor 10 according to the present preferred embodiment includes one or more detection electrodes 12, a contact electrode 13, one or more detection circuits 21, and an excitation circuit 22 as depicted, for example, in FIGS. 1 and 2.

Each detection electrode 12 is used to detect electrostatic capacitance in response to the proximity of an object. Each detection electrode 12 is disposed close to the operation surface 11 of the controller 1 so as to be capacitively coupled to an object such as the finger 52 of the user 5. In the example in FIG. 1, two detection electrodes 12 are disposed next to each other in the Y direction. The proximity sensor 10 may include three or more detection electrodes 12 or one detection electrode 12, for example.

The contact electrode 13 is disposed separately from the at least one detection electrode 12 to establish contact between the user 5 and the controller 1 while the user 5 uses the controller 1. The contact electrode 13 is disposed in the controller 1 at any position that is expected to be in contact with the body 51 of the user 5 regardless of details of operation by the user 5. In the example in FIG. 1, the contact electrode 13 is disposed on the opposite surface (negative Z side) of the body of the controller 1 from the operation surface 11 (refer to FIG. 4).

The excitation circuit 22 is configured to generate an excitation voltage, which is a preset alternating current voltage. Examples of the excitation voltage include various types of alternating current voltages, and the excitation voltage may have various types of waveforms including, for example, a pulse waveform and a sinusoidal waveform. In addition, the excitation voltage has an alternating current frequency low enough to satisfy an approximation condition described below (for example, a few MHz or lower). For example, the excitation circuit 22 may include a pulse oscillator or a similar component. In the present preferred embodiment, the excitation circuit 22 is connected to the contact electrode 13. Further, the excitation circuit 22 may be driven and controlled, for example, by the control circuit 20.

Figure 3:
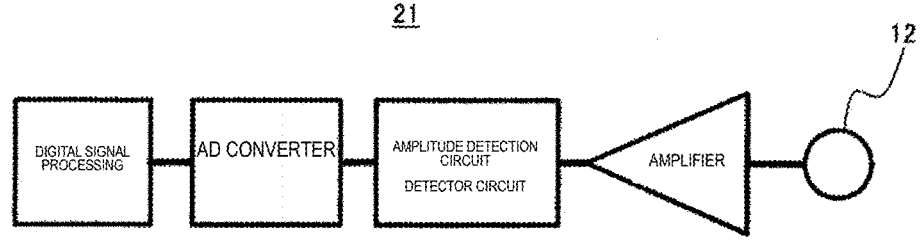
FIG. 3 is a block diagram of an example of a configuration of a detection circuit in the proximity sensor in the controller.

Each detection circuit 21 is connected to either a detection electrode 12 or the contact electrode 13, whichever the excitation circuit 22 is not connected. Each detection circuit 21 is configured to generate a detection signal Sd in response to a detection voltage, which is a voltage that is input from the corresponding electrode connected to the detection circuit 21, and the detection circuit 21 is configured to output the detection signal Sd to, for example, the control circuit 20. The detection signal Sd represents the degree of proximity of an object based on the electrostatic capacitance at each detection electrode 12. In the present preferred embodiment, each detection circuit 21 is disposed so as to be connected to, for example, the corresponding detection electrode 12. FIG. 3 depicts an example of a configuration of each detection circuit 21.

FIG. 3 depicts an example of a configuration of a detection circuit 21 corresponding to one detection electrode 12. The detection circuit 21 includes, for example, an amplifier having high input impedance, an amplitude detection circuit and/or a detector circuit configured to receive the detection voltage from the detection electrode 12 via the amplifier, analog-to-digital (AD) converter, and a digital signal processor. A component such as the digital signal processor in the detection circuit 21 may be integrated into the control circuit 20 in the controller 1.

Referring back to FIG. 2, the control circuit 20 is configured to control, for example, overall operation of the controller 1. For example, the control circuit 20 is configured to generate a control signal based on the details of operation by the user 5 in response to the detection signal Sd from each detection circuit 21 of the proximity sensor 10. The control signal may be output to an apparatus outside the controller 1 or used for the control inside the controller 1. The control circuit 20 may be configured to control driving of a circuit such as the excitation circuit 22 in the proximity sensor 10.

The control circuit 20 includes, for example, a CPU and configured to provide predetermined functions in cooperation with software. The control circuit 20 includes internal memories such as a ROM and a RAM and is configured to provide various functions by reading data and programs stored in the ROM, loading the data and the programs onto the RAM, and executing various kinds of computing processing. The control circuit 20 may be a hardware circuit such as a dedicated electronic circuit or a reconfigurable electronic circuit, which is designed to provide a predetermined function. The control circuit 20 may include various semiconductor integrated circuits such as a CPU, an MPU, a DSP, an FPGA, and an ASIC.

Figure 4:
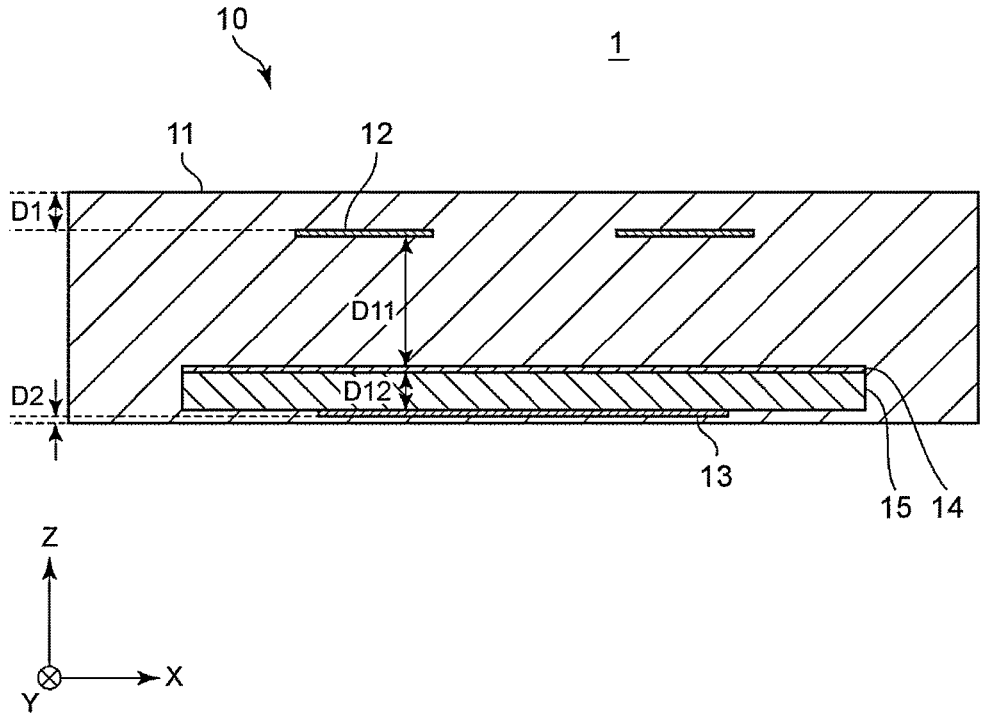
FIG. 4 is a cross-sectional view of the controller according to the first preferred embodiment of the present invention.

FIG. 4 is a cross-sectional view of the controller 1 according to the present preferred embodiment, which is viewed in the Y direction. The cross section depicted in FIG. 4 presents the XZ plane passing through the electrodes 12 and 13 in the controller 1. The proximity sensor 10 in the controller 1 further includes a ground electrode 14 and a substrate 15 as depicted, for example, in FIG. 4. The various types of electrodes 12, 13, and 14 each have, for example, a main surface parallel to the XY plane. For example, as depicted in FIG. 1, the area of the one or more detection electrodes 12 on the positive Z side is smaller than the area of the contact electrode 13 on the negative Z side in the XY plane.

The ground electrode 14 is configured to provide the ground in the controller 1. The ground electrode 14 is connected to various circuits including, for example, the excitation circuit 22 and each detection circuit 21, and the ground electrode 14 provides the reference electric potential shared by the connected circuits. The ground electrode 14 may include a conductor plate or a conductive mesh. The ground electrode 14 need not necessarily be planar.

As depicted, for example, in FIG. 4, the ground electrode 14 is disposed between each detection electrode 12 and the contact electrode 13 inside the body of the controller 1. In addition, the ground electrode 14 has a larger area than the one or more detection electrodes 12 and the contact electrode 13 and is disposed so as to separate each detection electrode 12 and the contact electrode 13. This arrangement reduces parasitic capacitance between each detection electrode 12 and the contact electrode 13.

In the controller 1 according to the present preferred embodiment, as depicted, for example, in FIG. 4, a distance D11 between each detection electrode 12 and the ground electrode 14 is set to be larger than a distance D12 between the contact electrode 13 and the ground electrode 14. This arrangement reduces parasitic capacitance between each detection electrode 12 and the ground electrode 14. For example, the ground electrode 14 is disposed on the main surface of the substrate 15 on the positive Z side, and the contact electrode 13 is disposed on the main surface on the opposite side, which is the negative Z side.

The substrate 15 may include various circuits for the proximity sensor 10 and the controller 1. The substrate 15 need not be planar and may be curved or bend sharply. Further, the proximity sensor 10 may omit the substrate 15 and other components as appropriate. The outside of the body of the controller 1 need not be defined by a collection of planes and may include curved surfaces.

In the example in FIG. 4, each detection electrode 12 is disposed lower than the operation surface 11 of the controller 1 by a distance D1 (that is, inside the controller 1). The contact electrode 13 is disposed, for example, higher than the other surface of the controller 1 from the operation surface 11 by a distance D2 (that is, inside the controller 1). The distances D1 and D2 are examples of a contact distance, which is a distance from a body portion such as the finger 52 that is in contact with the controller 1. As depicted, for example, in FIG. 4, the contact electrode 13 and each detection electrode 12 are disposed in such a manner that the contact distance D2 of the contact electrode 13 is shorter than the contact distance D1 of each detection electrode 12.

The contact distance D2 of the contact electrode 13 may equal zero (D2=0), and the contact electrode 13 may be disposed on the outside of the controller 1. The contact electrode 13 may be covered with a thin film formed by a technique such as laminating various dielectric materials or affixing a film. Each detection electrode 12 may also be covered with a thin film similarly to the contact electrode 13. The thicknesses of the thin films may be defined to enable the contact distances D1 and D2 of the electrodes 12 and 13 to have a relationship D1>D2.

2 Operation

The operation of the proximity sensor 10 in the controller 1, which is configured as above, will be described herein.

2-1 Operational Principle

Figure 5:
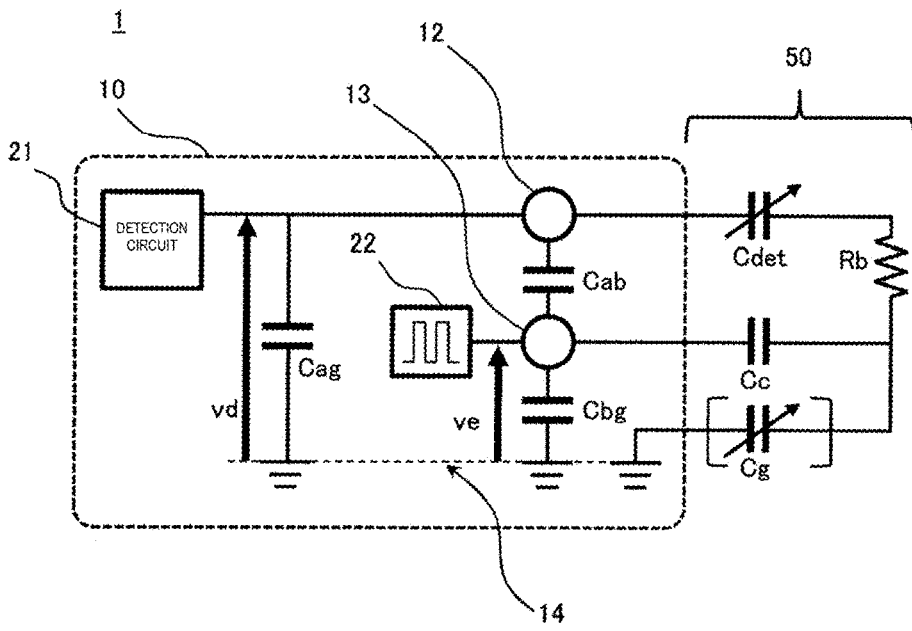
FIG. 5 is an illustration for describing the operational principle of the proximity sensor according to the first preferred embodiment of the present invention.

FIG. 5 is an illustration for describing the operational principle of the proximity sensor 10 according to the present preferred embodiment. FIG. 5 illustrates an equivalent circuit of the proximity sensor 10 according to the present preferred embodiment. The equivalent circuit in FIG. 5 illustrates the proximity sensor 10 including a single detection electrode 12.

FIG. 5 illustrates various types of parasitic capacitance in the proximity sensor 10 in the controller 1. The various types of parasitic capacitance include parasitic capacitance Cab between the detection electrode 12 and the contact electrode

13, parasitic capacitance Cag between the detection electrode 12 and the ground electrode 14, and parasitic capacitance Cbg between the contact electrode 13 and the ground electrode 14.

In the example in FIG. 5, a human body model 50 is used to simulate the user 5 of the controller 1 (FIGS. 1 and 2). The human body model 50 includes detection capacitance Cdet representing capacitive coupling to the detection electrode 12, internal resistance Rb of the human body model 50, connection capacitance Cc representing capacitive coupling to the contact electrode 13, and ground capacitance Cg representing capacitive coupling to the ground electrode 14.

The detection capacitance Cdet is electrostatic capacitance to be detected with the proximity sensor 10. The connection capacitance Cc is electrostatic capacitance generated by the contact with the user 5 and larger than the detection capacitance Cdet. The detection capacitance Cdet and the connection capacitance Cc are examples of first and second electrostatic capacitance, respectively, in the proximity sensor 10.

In the proximity sensor 10 according to the present preferred embodiment, the excitation circuit 22 is configured to generate an excitation voltage ve having an alternating current frequency of ω and provide the contact electrode 13 with the generated excitation voltage ve. The excitation voltage ve is defined with respect to the reference electric potential of the ground electrode 14. The contact electrode 13 and the detection electrode 12 are coupled to each other by the human body model 50.

The detection circuit 21 according to the present preferred embodiment is configured to consecutively apply the detection voltage vd to the detection electrode 12 while the excitation circuit 22 supplies the excitation voltage ve and is configured to, in response to the detection voltage vd, generate the detection signal Sd representing the detection result by the proximity sensor 10. The detection voltage vd is defined with respect to the reference electric potential of the ground electrode 14. The detection signal Sd has a value, for example, in proportion to vd/ve.

For the proximity sensor 10 according to the present preferred embodiment, which is configured to operate as above, Equation (1) is derived from the equivalent circuit in FIG. 5.

$$\frac{v_d}{v_e} = \frac{\dfrac{1}{Z_b} + j\omega C_{AB}}{\dfrac{1}{Z_b} + j\omega C_{AB} + j\omega C_{AG}} \tag{1}$$

In Equation (1), j represents a complex number. Impedance of a human body corresponding to the human body model 50 is represented by Zb and given by Equation (10).

$$Z_b = \frac{1}{j\omega C_{det}} + \frac{1}{j\omega C_c} + R_b \tag{10}$$

If the connection capacitance Cc is sufficiently large and the internal resistance Rb is less than 1/ωCc, Equation (1) can be approximated by Equation (2) as follows. In this approximation, for example, large capacitance is assumed to be detected in proximity detection, and, for example, if an area of the electrode of 100 square mm (10 mm×10 mm), a distance of 10 mm, and a frequency of 1 MHz are assumed, the first term of Equation (10), 1/jωCdet, equals −j 1.8 MΩ.

Since the resistance of a human body (that is, Rb) is expected to be from 500Ω to a maximum 10 kΩ, the third term of Equation (10) is negligibly small compared with the magnitude of the first term, which is 11/jωCdet1. In addition, since the assumption about device configuration yields Cdet<<Cc, the second term in Equation (10) is also negligible similarly to the third term.

$$\frac{v_d}{v_e} = \frac{C_{AB} + C_{det}}{C_{AB} + C_{det} + C_{AG}} \tag{2}$$

As can be seen in Equation (2), the voltage ratio vd/ve is represented by capacitance ratios, that is, the detection voltage vd and the excitation voltage ve do not have a phase difference, and the voltage ratio vd/ve may be determined by the magnitude of the detection voltage vd, |vd|. The approximation condition for Equation (2) is satisfied while the user 5 is in contact with the contact electrode 13. Since the parasitic capacitances Cab and Cag have fixed values in the proximity sensor 10, the voltage ratio vd/ve only depends on the change in the detection capacitance Cdet in Equation (2). Thus, based on the detection signal Sd obtained by the detection circuit 21, the proximity sensor 10 according to the present preferred embodiment is able to detect the degree of proximity of a body portion such as the finger 52 of the user 5 to the detection electrode 12 while the user 5 is in contact with the contact electrode 13 as in the human body model 50.

In contrast, if the connection capacitance Cc is sufficiently small instead of the approximation condition as above for the controller 1 in use, Equation (1) may be approximated by Equation (3).

$$\frac{v_d}{v_e} = \frac{C_{AB}}{C_{AB} + C_{AG}} \tag{3}$$

The approximation condition of Equation (3) is satisfied while the user 5 is not in contact with the contact electrode 13. In this case, Equation (3) indicates that the detection signal Sd is insensitive to the detection capacitance Cdet. In other words, if the body 51 is not in contact with the contact electrode 13, the detection signal Sd of the proximity sensor 10 is rendered insensitive to the proximity of a body portion such as the finger 52 to the detection electrode 12. Similarly to the above, the detection signal Sd of the proximity sensor 10 may be rendered insensitive to the proximity of a person such as other than the user 5 to the detection electrode 12 while the user 5 is in contact with the contact electrode 13.

The ground capacitance Cg of the human body model 50 may unintentionally be generated when the user 5 uses the controller 1. However, if the user 5 is in contact with the contact electrode 13 in the proximity sensor 10 according to the present preferred embodiment as depicted in FIG. 5, that is, if the connection capacitance Cc is sufficiently large, the ground capacitance Cg is in parallel with the parasitic capacitance Cbg and is not included in Equations (1) to (3) derived from the operational principle. If the user 5 is not in contact with the contact electrode 13 and the connection capacitance Cc is sufficiently small, the sensitivity for detecting the detection capacitance Cdet is lost as in the previous case. Thus, the detection by the proximity sensor 10 may be rendered insensitive to the ground capacitance Cg of the user 5.

2-2 Various Types of Capacitance

Figure 6:
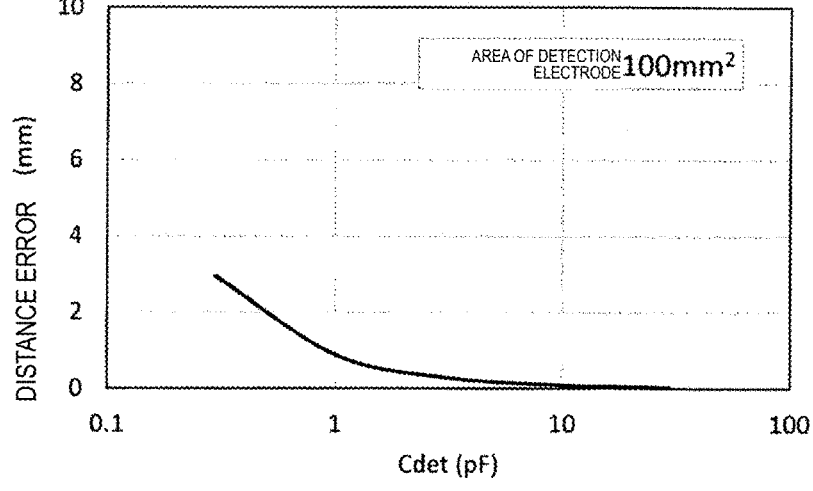
FIG. 6 is a graph indicating a relationship between the connection capacitance and the distance error of the proximity sensor.

Referring to FIGS. 6 and 7, description will be given with regard to various types of capacitance in the proximity sensor 10 operating based on the operational principle described above.

FIG. 6 is a graph indicating a relationship between the connection capacitance and the distance error of the proximity sensor 10. According to the operational principle described above, the distance error in a measured distance from the detection electrode 12 to an object increases as the connection capacitance Cc decreases irrespective of the measured distance as depicted in FIG. 6. In other words, an increase in the connection capacitance Cc leads to improvement in the detection accuracy of the proximity sensor 10. For example, a distance error of about 1 mm or less is desirable to accurately detect a distance about 5 mm to about 50 mm. For this degree of accuracy, a connection capacitance Cc of about 1 pF or larger is desirable. The lower limit of the connection capacitance Cc varies in proportion to the area of the detection electrode 12.

FIGS. 7A to 7C illustrate tables for describing relationships between parasitic capacitances Cag and Cab in the proximity sensor 10. FIG. 7A presents the voltage ratio vd/ve as a function of the capacitance ratio Cag/Cab and the parasitic capacitance Cab for a measured distance of about 50 mm, for example. FIG. 7B presents the voltage ratio vd/ve as a function of the capacitance ratio Cag/Cab and the parasitic capacitance Cab for a measured distance of about 10 mm, for example. FIG. 7C presents the rate of the signal change caused by the change in the measured distance in the range between the distances for FIGS. 7A and 7B as a function of the parasitic capacitances Cag and Cab.

If the parasitic capacitance Cag is significantly larger than the parasitic capacitance Cab, the detection voltage vd, which is output, is smaller than the excitation voltage ve, which is input, as depicted in FIGS. 7A and 7B. For example, if the parasitic capacitance Cag exceeds 100 times the parasitic capacitance Cab, the detection voltage vd has an amplitude less than about 1% of the amplitude of the excitation voltage ve, for example, and a satisfactory signal to noise ratio cannot be obtained. Based on the above observation, the parasitic capacitance Cag is preferably about 100 times the parasitic capacitance Cab or less.

If the parasitic capacitance Cab is large, the rate of the signal change caused by the change in the distance to an object in the range between the distances for FIGS. 7A and 7B are small as depicted in FIG. 7C. For example, if the parasitic capacitance Cab is about 10 pF, the rate of the signal change is less than about 2%. If the change is as small as this value, accurate determination of the distance may be difficult. The parasitic capacitance Cab is preferably equal to 1 pF or less, more preferably as small as possible to obtain a rate of the signal change of about 10% or larger for a change in the distance in the range between about 50 mm and about 5 mm, which is a practical range for the controller 1 designed for portable use. The above discussion is based on the assumption that the area of the detection electrode 12 is about 100 square mm, for example. If the area of the detection electrode 12 is changed, the upper limit of the parasitic capacitance Cab may vary in proportion to the area of the detection electrode 12.

For example, to detect a fingertip of a size of about 10 mm×20 mm located at a distance of about 3 cm, the detection capacitance Cdet as small as about 60 fF needs to be detected based on the approximation of a parallel plate capacitor, for example. A capacitance change as small as possible up to the order of fF is preferably detected as the detection capacitance Cdet. If the parasitic capacitance Cab is small but the parasitic capacitance Cag is large, the voltage ratio vd/ve given by Equation (2) approaches zero (or Cab/(Cab+Cag)), and a minute capacitance change is expected to be difficult to detect. Thus, reducing the parasitic capacitance Cag is effective.

For example, the area of the detection electrode 12 is assumed to be approximately 10 mm×10 mm, and the detection electrode 12 is assumed to be disposed on the operation surface 11 located at a distance of about 10 mm from the ground electrode 14 and from the body surface of the controller 1 where the ground electrode 14 is disposed. In such a case, the parasitic capacitance Cag is about 88 fF, which is approximately the same order as the capacitance to be detected, and the proximity detection is possible. In contrast, for example, if the distance between the detection electrode 12 and the ground electrode 14 is close to the thickness of the substrate 15, which is about 1 mm, the parasitic capacitance Cag is about 880 fF, which is equal to 10 times the capacitance to be detected or more, and accurate proximity detection is difficult to perform.

2-3 Example of Operation

An example of operation of the proximity sensor 10 in the controller 1 according to the present preferred embodiment will be described with reference to FIGS. 8, 9A and 9B. Description will be given below with regard to an example of operation in which the control circuit 20 in the controller 1 is configured to control the proximity sensor 10.

FIG. 8 is a flowchart depicting an example of operation of the proximity sensor 10 in the controller 1. FIGS. 9A and 9B are timing charts for describing an example of operation of the proximity sensor 10. FIG. 9A presents the timing of the excitation signal that is output from the excitation circuit 22. FIG. 9B presents a voltage waveform of the detection signal Sd that is input into the detection circuit 21.

First of all, the control circuit 20 sends a trigger signal to the excitation circuit 22 to cause the excitation circuit 22 to raise the excitation signal corresponding to the excitation voltage ve to a high level (Hi) at a time t1 as depicted in FIG. 9A (S1). Next, the control circuit 20 causes the detection circuit 21 to AD convert a received voltage (S2) at a time t2 (Fig. B) when a predetermined time has elapsed after the time t1, and the control circuit 20 saves a voltage value indicating the detection signal Sd at the time t2 to an internal memory (S3).

Then, the control circuit 20 sends a trigger signal to the excitation circuit 22 again to cause the excitation circuit 22 to lower the excitation signal to a low level (Lo) at a time t3 as depicted in FIG. 9A (S4). Next, as in step S2, the control circuit 20 causes the detection circuit 21 to perform AD conversion (S5) at a time t4 (FIG. 9B) when a predetermined time has elapsed, and the control circuit 20 saves a voltage value indicating the detection signal Sd at the time t4 to the internal memory (S6).

Next, the control circuit 20 calculates the difference between the voltage values stored in steps S3 and S6 and saves the calculation result as a detection level (S7). For example, the control circuit 20 repeats the above steps S1 to S6 a predetermined number of times (S8) and performs an averaging process on the obtained calculation results (S9).

The control circuit 20 assesses the operation by the user 5 based on the detection result obtained by the proximity sensor 10 in this way and performs various types of signal processing including generation of a control signal (S10). The control circuit 20 completes the process represented by the present flowchart with this step. For example, the control circuit 20 repeats the process represented by the present flowchart at predetermined intervals.

In the above process, the results of proximity detection performed by the proximity sensor 10 are averaged as appropriate (S1 to S9), and the controller 1 may perform various types of signal processing that follow the above process based on the averaging result. The averaging steps S9 and S10 may be omitted as appropriate.

3 Summarization

As described above, the proximity sensor 10 according to the present preferred embodiment includes the one or more detection electrodes 12, the contact electrode 13, the excitation circuit 22, and the one or more detection circuits 21. The user 5 of the controller 1 and various body portions of the user 5 are examples of an object according to the present preferred embodiment. Each detection electrode 12 is configured to be capacitively coupled to the user 5 (the finger 52 of the user 5) as an example of an object located in proximity. The contact electrode 13 is in contact with the user 5 (the body 51 of the user 5). The excitation circuit 22 is connected to an electrode 13 that is selected from the one or more detection electrodes 12 and the contact electrode 13, and the excitation circuit 22 is configured to supply the electrode 13 with the excitation voltage ve. Each detection circuit 21 is connected to another electrode 12 that is selected from the one or more detection electrodes 12 and the contact electrode 13, and the detection circuit 21 is configured to, based on the detection voltage vd at the electrode 12, generate the detection signal Sd in response to the detection capacitance Cdet, which is an example of the first electrostatic capacitance between the one or more detection electrodes 12 and an object. Each detection circuit 21 is configured to generate the detection signal Sd in response to the detection capacitance Cdet, which is smaller than the connection capacitance Cc, which is an example of the second electrostatic capacitance between the contact electrode 13 and the object, the detection signal Sd indicating the degree of proximity of the object to the one or more detection electrodes 12, the object being in contact with the contact electrode 13.

When the user 5 uses the controller 1, the proximity sensor 10 described above is capable of accurately detecting the proximity of an object such as the finger 52 of the user 5 under the condition that the user 5 be in contact with the contact electrode 13 while the user 5 touches the controller 1.

According to the present preferred embodiment, the contact electrode 13 has a larger area than the one or more detection electrodes 12. This arrangement tends to render the connection capacitance Cc larger than the detection capacitance Cdet and may facilitate the proximity detection of an object based on the detection capacitance Cdet, which is in a range smaller than the connection capacitance Cc.

According to the present preferred embodiment, the contact distance D2, which is an example of the distance between the contact electrode 13 and an object in contact with the contact electrode 13, is smaller than the contact distance D1, which is an example of the distance between the detection electrode 12 and an object in contact with the detection electrode 12. This arrangement tends to render the connection capacitance Cc larger than the detection capacitance Cdet and may facilitate the proximity detection of an object.

According to the present preferred embodiment, the contact electrode 13 may be exposed so as to directly touch an object. Each detection electrode 12 is disposed, for example, so as to indirectly touch the object. This arrangement tends to render the connection capacitance Cc larger than the detection capacitance Cdet and may further facilitate the proximity detection of an object.

According to the present preferred embodiment, the proximity sensor 10 further includes the ground electrode 14 that is disposed between the one or more detection electrodes 12 and the contact electrode 13 and that is shared by the excitation circuit 22 and the one or more detection circuits 21. The ground electrode 14 disposed as above may reduce the parasitic capacitance Cab between the one or more detection electrodes 12 and the contact electrode 13 and improve the accuracy of proximity detection of an object.

According to the present preferred embodiment, the parasitic capacitance Cag is equal to or less than 100 times the parasitic capacitance Cab, where Cag is the electrostatic capacitance between the ground electrode 14 and the detection electrode 12 connected to the detection circuit 21, and Cab is the electrostatic capacitance between the one or more detection electrodes 12 and the contact electrode 13, the one or more detection electrodes 12 being selected from the one or more detection electrodes 12 and the contact electrode 13. Since the parasitic capacitance Cag between the one or more detection electrodes 12 and the ground electrode 14 is not exceedingly large in this arrangement, the proximity of an object may be accurately detected.

According to the present preferred embodiment, the ground electrode 14 has a larger area than the one or more detection electrodes 12 and has a larger area than the contact electrode 13. This arrangement may reduce the parasitic capacitance Cab and improve the accuracy of proximity detection of an object.

According to the present preferred embodiment, each detection circuit 21 is connected to the corresponding detection electrode 12. The excitation circuit 22 is connected to the contact electrode 13. The ground electrode 14 is disposed closer to the contact electrode 13 than to the one or more detection electrodes 12. This arrangement may reduce the parasitic capacitance Cag between the one or more detection electrodes 12 and the ground electrode 14 and enable accurate detection of the proximity of an object.

The controller 1 according to the present preferred embodiment includes the proximity sensor 10 and the control circuit 20 configured to generate the control signal in response to the detection signal Sd generated by the proximity sensor 10. The controller 1 as above enables the proximity sensor 10 to accurately detect the proximity of an object in contact with the controller 1.

Second Preferred Embodiment

Figure 11:
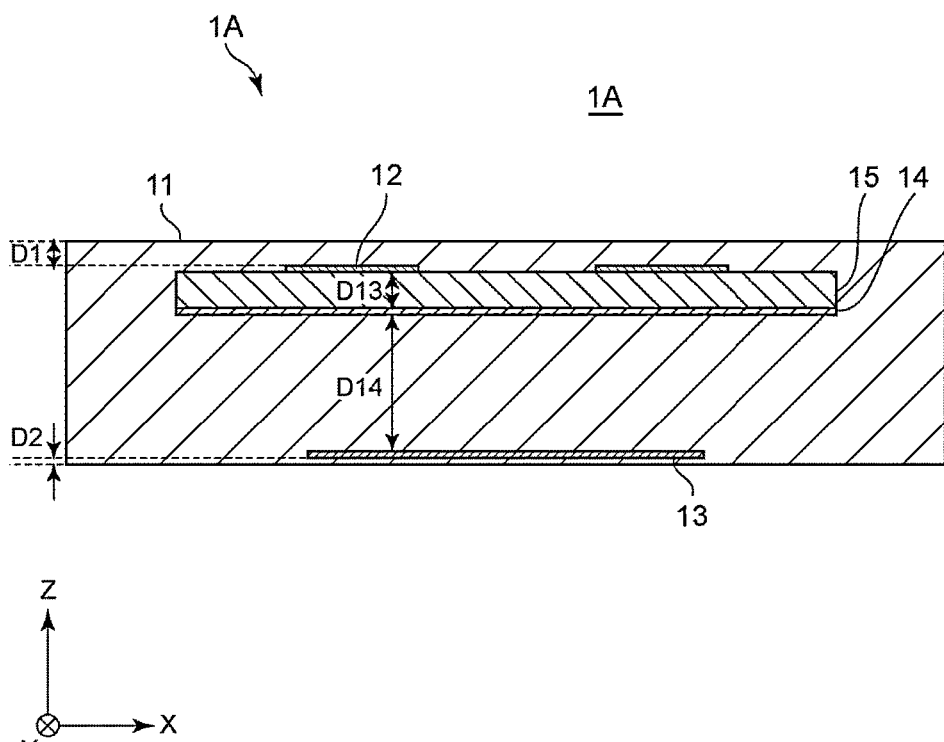
FIG. 11 is a cross-sectional view of the controller according to the second preferred embodiment of the present invention.

Referring to FIGS. 10 and 11, description will be given in a second preferred embodiment with regard to a modification to the operational principle of the proximity sensor.

FIG. 10 is a block diagram of an example of a configuration of a controller 1A according to the second preferred embodiment. In the proximity sensor 10 in the controller 1 according to the first preferred embodiment, each detection circuit 21 is connected to the corresponding detection electrode 12, and the excitation circuit 22 is connected to the contact electrode 13. The controller 1A according to the present preferred embodiment has a configuration similar to the configuration of the controller 1 according to the first preferred embodiment, but the detection circuit 21 is connected to the contact electrode 13 and each excitation circuit 22 is connected to the corresponding detection electrode 12 in a proximity sensor 10A as depicted in FIG. 10.

According to the present preferred embodiment, for example, multiple excitation circuits 22 corresponding to multiple detection electrodes 12 are each connected to the corresponding detection electrode 12. Each excitation circuit 22 may supply an excitation signal corresponding to the excitation voltage ve to the corresponding detection electrode 12 in a time-sharing manner. Alternatively, the excitation signal from each excitation circuit 22 may undergo FM or PWM processing. In this way, the detection circuit 21 according to the present preferred embodiment is able to detect a voltage change in the detection voltage vd from the contact electrode 13 in response to each excitation signal supplied to the corresponding detection electrode 12.

The proximity sensor 10A according to the present preferred embodiment, which is configured as above, operates based on Equation (21) rather than Equation (1) based on the operational principle in the first preferred embodiment.

$$\frac{v_d}{v_e} = \frac{\frac{1}{Z_b} + j\omega C_{AB}}{\frac{1}{Z_b} + j\omega C_{AB} + j\omega C_{BG}} \quad (21)$$

In this case, if the user 5 satisfies the approximation condition for the controller 1 in use, Equation (22) holds true rather than Equation (2) in the first preferred.

$$\frac{v_d}{v_e} = \frac{C_{AB} + C_{det}}{C_{AB} + C_{det} + C_{BG}} \quad (22)$$

In contrast, if the user 5 satisfies the approximation condition for the contact electrode 13 being untouched, Equation (23) holds true rather than Equation (3) in the first preferred embodiment.

$$\frac{v_d}{v_e} = \frac{C_{AB}}{C_{AB} + C_{BG}} \quad (23)$$

Equations (21) to (23) based on the operational principle as described above indicate that the proximity sensor 10A according to the present preferred embodiment is able to identify the user 5 who is using the controller 1 and to perform accurate proximity detection similarly to the proximity sensor 10 according to the first preferred embodiment.

The proximity sensor 10 according to the first preferred embodiment is configured to reduce the parasitic capacitance Cag of the one or more detection electrodes 12 to improve the accuracy of proximity detection. Instead, Equation (22) indicates that the proximity sensor 10A according to the present preferred embodiment is configured to reduce the parasitic capacitance Cbg of the contact electrode 13 to improve the accuracy of proximity detection. An example of such a configuration will be described with reference to FIG. 11.

FIG. 11 is a cross-sectional view of the controller 1A according to the present preferred embodiment illustrated in the same manner as in FIG. 4. In the controller 1A according to the present preferred embodiment, as depicted, for example, in FIG. 11, a distance D14 between the ground electrode 14 and the contact electrode 13 connected to the detection circuit 21 in the proximity sensor 10A is set to be larger than a distance D13 between the ground electrode 14 and the one or more detection electrodes 12. This arrangement may reduce the parasitic capacitance Cbg and improve the accuracy of detection of the proximity sensor 10A.

For example, in the present preferred embodiment, the one or more detection electrodes 12 are disposed on the main surface on the positive Z side, which is the other side of the substrate 15 from the main surface on the negative Z side on which the ground electrode 14 is disposed. In the body of the controller 1A, the substrate 15 is disposed close to the operation surface 11, and the contact electrode 13 is disposed on the main surface on the other side from the operation surface 11. A structure in which the contact electrode 13 is separated from the substrate 15 is easily obtained in this arrangement.

As described above, the detection circuit 21 is connected to the contact electrode 13 in the proximity sensor 10A according to the present preferred embodiment. Each excitation circuit 22 is connected to the corresponding detection electrode 12. The ground electrode 14 is disposed closer to the one or more detection electrodes 12 than to the contact electrode 13. This arrangement may reduce the parasitic capacitance Cbg between the ground electrode 14 and the contact electrode 13 connected to the detection circuit 21 and enable accurate detection of the proximity of an object.

Third Preferred Embodiment

In a third preferred embodiment, an example of a configuration of a controller to be held by a user while in use will be described with reference to FIG. 12.

Figure 12:
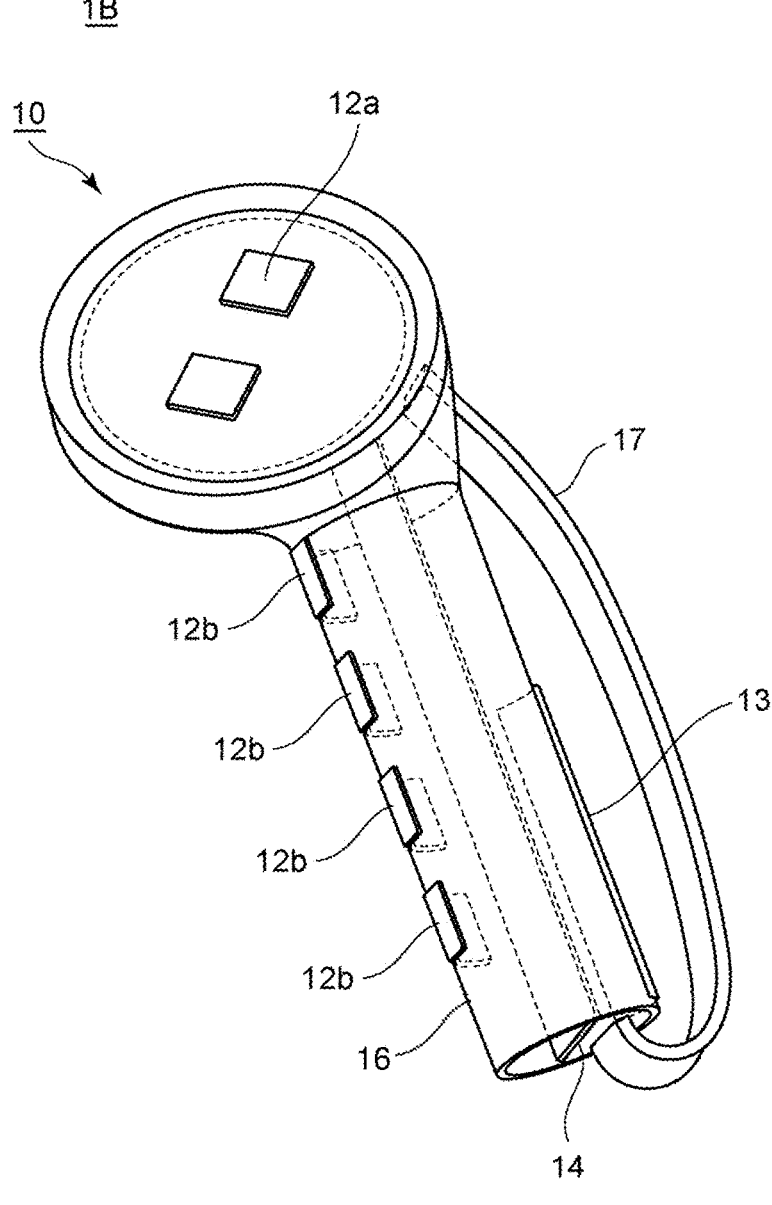
FIG. 12 is a perspective view of an example of a structure of a controller according to a third preferred embodiment of the present invention.

FIG. 12 is a perspective view of an example of a structure of a controller 1B according to the third preferred embodiment. The controller 1B according to the present preferred embodiment has a configuration similar to the configuration in the first preferred embodiment but includes a holding component 16 shaped as a grip to be held by a user's hand. The controller 1B may be used for various applications such as a game, manufacturing line control in a plant, or vehicle control.

The controller 1B illustrated in FIG. 12 includes the holding component 16 having the contact electrode 13 disposed on a portion to be touched by a palm. In the present preferred embodiment, the contact electrode 13 may be disposed on a portion to be touched by any or all of the index finger, the middle finger, the ring finger, the little finger, or the thumb of a hand that holds the holding component 16. In the example in FIG. 12, a belt 17 is attached to the holding component 16 of the controller 1, and the belt 17 is an example of an attaching component to fix the hand that holds the controller 1B. The contact electrode 13 may be disposed on a portion of a component, such as the belt 17, that is touched by the hand that holds the controller 1B. This arrangement of the contact electrode 13 may maintain stable contact between the hand and the contact electrode 13 while the controller 1B is used.

In the example in FIG. 12, the controller 1B includes detection electrodes 12a, 12b, 12c, 12d, and 12e for the thumb, the index finger, the middle finger, the ring finger, and the little finger, respectively, of a hand that holds the controller 1B.

For example, one or more detection electrodes 12a are disposed for the thumb within the thumb's reach near various operational components (not depicted) such as a button, a hold-down lever, and a force sensor, which are to be operated by the thumb in the controller 1B. The one or more detection electrodes 12a of this type for the thumb allow the movement of the thumb for operation to be detected before the thumb touches various operational components, and smooth and high-speed control is achievable by using the controller 1B.

One or more detection electrodes may be disposed for each finger other than the thumb and denoted by 12*b* to 12*e*. For example, multiple detection electrodes 12*b* disposed along the entire length of the index finger enable the degree of bending or curvature of the index finger to be detected. Such configuration enables the controller 1B to accurately detect actual movements of the hand, such as clasping and opening, pointing with a finger, and making a peace sign.

As described above, the controller 1B according to the present preferred embodiment further includes the holding component 16 to be held by the hand. The holding component 16 includes the contact electrode 13 disposed at a position to be touched by the holding hand. Each detection electrode 12 is disposed at a position where the contact electrode 13 is not disposed and where a finger of the holding hand may touch the corresponding detection electrode. This arrangement enables accurate detection of the proximity of a finger while maintaining stable contact with the hand holding the holding component 16.

In the present preferred embodiment, the holding component 16 includes multiple detection electrodes 12*a* to 12*e* in accordance with multiple fingers of the holding hand. This arrangement enables proximity detection of each finger and allows various types of operation of the controller 1B to be detected. The number of the detection electrodes 12*a* to 12*e* to be disposed need not equal the number of fingers to be detected and may obviously exceed the number of fingers to be detected.

Fourth Preferred Embodiment

In a fourth preferred embodiment, an example of a controller to be attached to a user's face while in use will be described with reference to FIG. 13.

Figure 13:
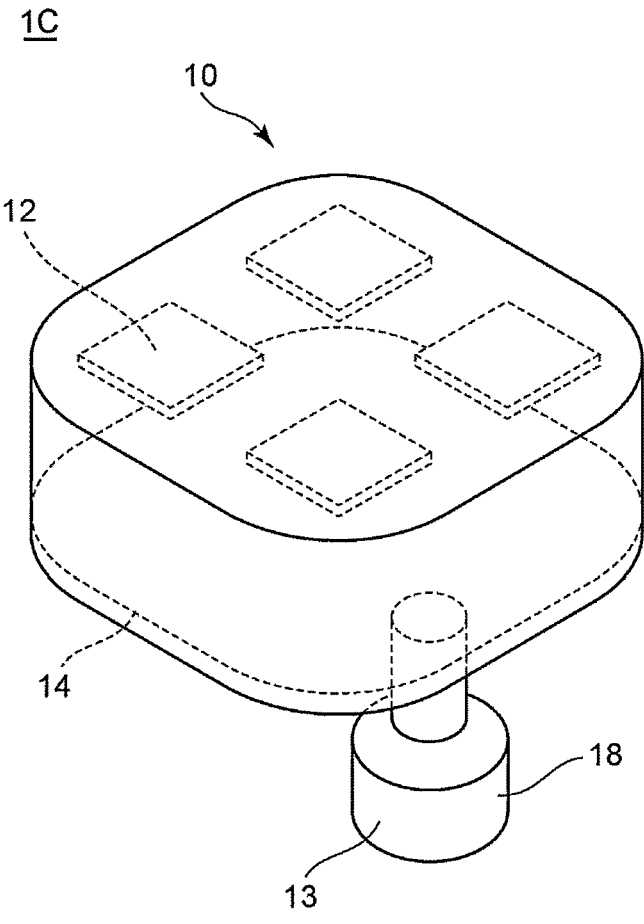
FIG. 13 is a perspective view of an example of a structure of a controller according to a fourth preferred embodiment of the present invention.

FIG. 13 is a perspective view of an example of a structure of a controller 1C according to the fourth preferred embodiment. As depicted in FIG. 13, the controller 1C according to the present preferred embodiment has a configuration, for example, similar to the configuration in the first preferred embodiment but is an earphone to be worn in the user's ear. The contact electrode 13 in the controller 1C according to the present preferred embodiment is formed, for example, by a conductive earpiece 18. This arrangement maintains stable contact between the user who wears the earphone and the contact electrode 13. The earpiece 18 is an example of an attaching component in the present preferred embodiment.

The controller 1C according to the present preferred embodiment is configured to detect operation by the user of the earphone who moves a hand close to one or more detection electrodes 12, and the operation of the earphone and various types of information communication are controlled by using the controller 1C. Examples of information communication include transmission of information to a mobile terminal from the earphone via short-range wireless communication such as Bluetooth.

As depicted, for example, in FIG. 13, the controller 1C according to the present preferred embodiment includes one or more detection electrodes 12 disposed close to a main surface on the other side of the earphone from the earpiece 18. This arrangement allows the user to control the earphone without being troubled by the inconvenience caused when the earphone is touched, such as a burden to the ear and contact noise. Since the proximity of the hand to each of the multiple detection electrodes 12 is accurately detected, multifunctionality through gesture input is possible and accurate. In addition, when an action such as gesture input is used in a place where people densely gather, such as in a crowd, the proximity of a body portion, such as a finger, of another person to the earphone does not cause unintended operation, and operation intended by the user who wears the earphone is accurately detected.

As described above, the controller 1C according to the present preferred embodiment further includes the earpiece 18 as an example of an attaching component to be attached to a human body. The contact electrode 13 is disposed at a position to be touched by a human body to which the attaching component is attached. This arrangement maintains stable contact with the wearer of the attaching component and provides accurate proximity detection to the wearer.

The description has been given above with regard to the earphone as an example of the controller 1C to be attached to the user's face while in use. In the present preferred embodiment, the controller 1C and the proximity sensor 10 need not necessarily be included in the earphone and may be included, for example, in smart glasses, a headset, or immersion-type VR goggles.

For example, smart glasses may include the contact electrode 13 of the proximity sensor 10 in the temple tips, which are put on the ears, or nose pads and may include the one or more detection electrodes 12 in the temples or the frame, so that the controller 1C is configured to detect the movement of a hand near the wearer's eyes. The above arrangement of the contact electrode 13 in such a configuration maintains stable contact with the body of the wearer of the smart glasses. Further, the above arrangement of the one or more detection electrodes 12 enables the user to control the smart glasses without being troubled by a burden of the smart glasses to the ears and the nose. As in the fourth preferred embodiment, multiple detection electrodes 12 enables gesture operation by the wearer to be accurately detected and easily achieves the multifunctionality of the controller 1C in the smart glasses.

If the controller 1C is included in a headset, the contact electrode 13 may be disposed in or on a supporting component, such as a T-shaped bar, or an ear pad, and the one or more detection electrodes 12 may be disposed in or on the head band, outside the speaker, or in the outer side portion of a microphone support, so that the movement of a hand around the wearer's face may be detected by using the controller 1C. This arrangement provides advantageous effects similar to those in the above preferred embodiments with respect to operational control of the headset.

If the controller 1C is included in VR goggles, the contact electrode 13 may be disposed as a face cover made of conductive material and the one or more detection electrodes 12 may be disposed on the outer side portion of the goggle, so that the movement of a hand around the wearer's face may be detected by using the controller 1C. This arrangement provides advantageous effects similar to those in the above preferred embodiments with respect to operational control of the VR goggles. For example, the detection electrodes 12 disposed outside the goggles allow the user to perform operational control without touching the goggles, avoiding swaying or misalignment of the goggles. If it is difficult to accurately determine the actual position of the hand by using the goggles, the controller 1C and the proximity sensor 10 according to the present preferred embodiment may be included in VR goggles configured to operate with a device such as an image sensor or a TOF camera to accurately determine the position of the hand.

Fifth Preferred Embodiment

In a fifth preferred embodiment, an example of a controller to be attached to a user's body while in use will be described with reference to FIG. 14.

Figure 14:
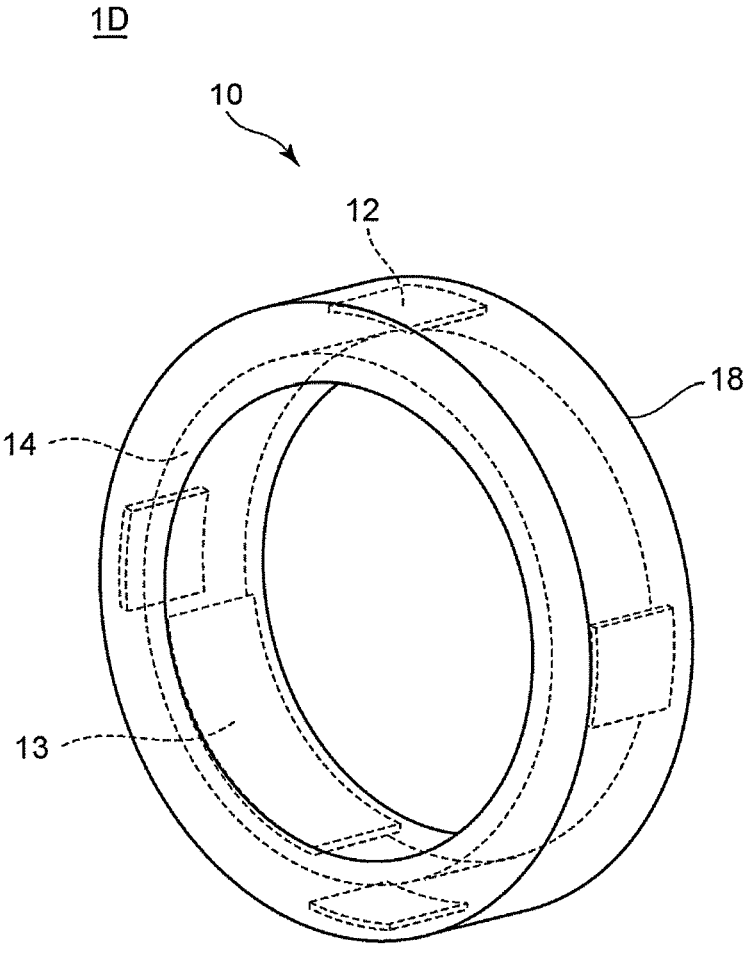
FIG. 14 is a perspective view of an example of a structure of a controller according to a fifth preferred embodiment of the present invention.

FIG. 14 is a perspective view of an example of a structure of a controller 1D according to the fifth preferred embodiment. The controller 1D according to the present preferred embodiment has a configuration, for example, similar to the configuration in the first preferred embodiment but includes a ring-shaped component 19 to be attached, for example, to a user's wrist. The ring-shaped component 19 may be designed to be attached to not only the user's wrist but also various body portions such as an arm or a finger. The controller 1D according to the present preferred embodiment may be included, for example, in a smart watch or a smart ring. Both ends of a band-like component of the ring-shaped component 19 may be connected to form a closed ring or disconnected to form an open ring when the user wears the ring-shaped component 19.

As depicted, for example, in FIG. 14, the contact electrode 13 is disposed on the inner perimeter surface of the ring-shaped component 19 in the controller 1D according to the present preferred embodiment. One or more detection electrodes 12 are disposed on the outer perimeter surface of the ring-shaped component 19. The controller 1D of this type provides the same advantageous effects as the above preferred embodiments. For example, if the user operates the smart watch or the smart ring with clothes or a glove interposed therebetween, the controller 1D according to the present preferred embodiment may easily detect such operation.

As described above, the controller 1D according to the present preferred embodiment further includes the ring-shaped component 19. The one or more detection electrodes 12 are disposed on the outer perimeter surface of the ring-shaped component 19. The contact electrode 13 is disposed on the inner perimeter surface of the ring-shaped component 19. This arrangement maintains contact with the wearer of the ring-shaped component 19 and provides accurate proximity detection to the wearer.

The description has been given above with regard to the use of the ring-shaped component 19 as an example of the controller 1D to be attached to the user's body when in use. In the present preferred embodiment, the controller 1D and the proximity sensor 10 are not limited to this type and may be configured to, for example, stick to the body when in use.

For example, a wearable biometric sensor of a sticky type may include the contact electrode 13 disposed on a portion that sticks to a skin of a human body and the one or more detection electrodes 12 disposed on the outer side portion. In many cases of such healthcare usage, safety is important. Using the controller 1D according to the present preferred embodiment in such cases may improve safety because the operation intended only by the wearer is detected. Alternatively, the controller 1D of this type may be configured to stop operating or issue an alarm when the wearer moves the hand close to or touches the controller 1D. In addition, a nurse or a healthcare worker may also operate the controller 1D while holding the wearer's hand or touching the wearer's body, and safety may be maintained because operation intended by such caregivers is only allowed. Examples of healthcare devices include a phonocardiograph, an electrocardiograph, a heart rate monitor, an electroencephalograph, an SPO2 meter, and various types of massage machines.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A proximity sensor comprising:
one or more detection electrodes to be capacitively coupled to an object located in proximity to the one or more detection electrodes;
a contact electrode to be in contact with the object;
an excitation circuit that is connected to either one of the one or more detection electrodes or the contact electrode to supply an excitation voltage to the electrode to which the excitation circuit is connected;
a detection circuit that is connected to either one of the one or more detection electrodes or the contact electrode, whichever the excitation circuit is not connected to, the detection circuit being operable to, based on a detection voltage at the electrode connected to the detection circuit, generate a detection signal in response to a first electrostatic capacitance between the one of the one or more detection electrodes and the object; and
a ground electrode between the one or more detection electrodes and the contact electrode and shared by the excitation circuit and the detection circuit; wherein
the detection circuit is operable to generate the detection signal in response to the first electrostatic capacitance, which is smaller than a second electrostatic capacitance between the contact electrode and the object, the detection signal indicating a degree of proximity of the object to the one of the one or more detection electrodes, the object being in contact with the contact electrode; and
the contact electrode has a larger area than the one or more detection electrodes such that a connection capacitance of the contact electrode is larger than a detection capacitance of the one or more detection electrodes.

2. The proximity sensor according to claim 1, wherein a distance between the object and the contact electrode when the object is in contact with the contact electrode is smaller than a distance between the object and one of the one or more detection electrodes when the object is in contact with the one of the one or more detection electrodes.

3. The proximity sensor according to claim 1, wherein
the contact electrode is exposed so as to directly touch the object; and
the one or more detection electrodes are in indirect contact with the object.

4. The proximity sensor according to claim 1, wherein an electrostatic capacitance between the ground electrode and an electrode connected to the detection circuit is equal to or less than 100 times of an electrostatic capacitance between the one or more detection electrodes and the contact electrode, the electrode connected to the detection circuit being selected from the one or more detection electrodes and the contact electrode.

5. The proximity sensor according to claim 1, wherein the ground electrode has a larger area than the one or more detection electrodes and has a larger area than the contact electrode.

6. The proximity sensor according to claim 1, wherein
the detection circuit is connected to one of the one or more detection electrodes;
the excitation circuit is connected to the contact electrode; and the ground electrode is closer to the contact electrode than to the one of the one or more detection electrodes.

7. The proximity sensor according to claim 1, wherein the detection circuit is connected to the contact electrode; and the excitation circuit is connected to one of the one or more detection electrodes; and the ground electrode is closer to the one of the one or more detection electrodes than to the contact electrode.

8. A controller comprising:

the proximity sensor according to claim 1; and a control circuit to generate a control signal in response to a detection signal generated by the proximity sensor.

9. The controller according to claim 8, further comprising:

a holding component to be held by a hand; wherein the holding component includes the contact electrode located at a position to be touched by the hand holding the holding component; and the one or more detection electrodes are each located at a position that a finger of the hand is able to touch, the position being different from the position where the contact electrode is located.

10. The controller according to claim 9, wherein the holding component includes a plurality of detection electrodes corresponding to a plurality of fingers of the holding hand.

11. The controller according to claim 8, further comprising:

an attaching component to be attached to a human body; wherein the attaching component includes the contact electrode at a position to be touched by the human body to which the attaching component is attached.

12. The controller according to claim 8, further comprising:

a ring-shaped component; wherein the one or more detection electrodes are located on an outer perimeter surface of the ring-shaped component; and the contact electrode is located on an inner perimeter surface of the ring-shaped component.

13. The controller according to claim 8, wherein a distance between the object and the contact electrode when the object is in contact with the contact electrode is smaller than a distance between the object and one of the one or more detection electrodes when the object is in contact with the one of the one or more detection electrodes.

14. The controller according to claim 8, wherein the contact electrode is exposed so as to directly touch the object; and the one or more detection electrodes are in indirect contact with the object.

15. The controller according to claim 8, wherein an electrostatic capacitance between the ground electrode and an electrode connected to the detection circuit is equal to or less than 100 times of an electrostatic capacitance between the one or more detection electrodes and the contact electrode, the electrode connected to the detection circuit being selected from the one or more detection electrodes and the contact electrode.

16. The controller according to claim 8, wherein the ground electrode has a larger area than the one or more detection electrodes and has a larger area than the contact electrode.

* * * * *